(12) United States Patent
Aldwayyan et al.

(10) Patent No.: US 8,367,769 B2
(45) Date of Patent: Feb. 5, 2013

(54) SILICON-BASED NANOSILICON COMPOSITES AND FABRICATION METHODS

(75) Inventors: Abdullah Saleh Aldwayyan, Riyadh (SA); Mohamad Saleh AlSalhi, Riyadh (SA); Abdurahman Mohammed Aldukhail, Gassim (SA); Mansour S. Alhoshan, Riyadh (SA); Muhammad Naziruddin Khan, Manipur State (IN); Ghassan K. Al-Chaar, Champaign, IL (US); Munir Nayfeh, Urbana, IL (US)

(73) Assignee: NanoSi Advanced Technologies, Inc., Champaign, IL (US)

( * ) Notice: Subject to any disclaimer, the term of this patent is extended or adjusted under 35 U.S.C. 154(b) by 64 days.

(21) Appl. No.: 12/707,247

(22) Filed: Feb. 17, 2010

(65) Prior Publication Data

US 2010/0234204 A1 Sep. 16, 2010

Related U.S. Application Data

(60) Provisional application No. 61/153,088, filed on Feb. 17, 2009.

(51) Int. Cl.
*C03C 14/00* (2006.01)
*C09K 11/00* (2006.01)

(52) U.S. Cl. ....... 524/859; 216/24; 216/79; 252/301.16; 423/338; 423/347; 524/858; 528/39; 977/778; 977/779

(58) Field of Classification Search .................... None
See application file for complete search history.

(56) References Cited

U.S. PATENT DOCUMENTS

| | | | |
|---|---|---|---|
| 6,585,947 | B1 | 7/2003 | Nayfeh et al. |
| 6,597,496 | B1 | 7/2003 | Nayfeh et al. |
| 6,743,406 | B2 | 6/2004 | Nayfeh et al. |
| 6,984,842 | B1 | 1/2006 | Nayfeh et al. |
| 7,247,384 | B2 * | 7/2007 | Cai et al. ............... 428/446 |
| 2008/0102036 | A1 * | 5/2008 | Poss et al. ............... 424/9.6 |
| 2009/0117392 | A1 * | 5/2009 | Veinot et al. ........... 428/447 |
| 2010/0129300 | A1 | 5/2010 | Nayfeh et al. |

OTHER PUBLICATIONS

Abstract for JP 2002/154844 (May 2002).*
Machine translation into English of JP 2002/154844 (May 2002).*
"High-Rate Synthesis and Characterization of Brightly Luminescent Silicon Naoparticles with Applications in Hybrid Materials for Photonics and Biophotonics" authored by Swihart et al. and published in Proceedings of SPIE, (2003) vol. 522, 108-117.*
"Pore Structure Evolution of Silica Gel during Aging/Drying: Effect of Surface Tension" authored by Deshpande et al. and published in Materials Research Society Symposium Proceedings (1992) 271, 553-558.*
"Characteristics of Mechanically-milled Silicon Nanocrystals Embedded in TEOS Thin Films" authored by Lau et al. and published in Journal of Crystal Growth (2006) 288, 92-95.*
Abstract for "Silicon Nanoclusters in Si-SiO2 System" authored by Espipnoza-Beltran et al. and published in Materials Research Society Symposium Proceedings (2000).*
"Luminescent Si Nanoparticles in Sol-Gel Matrices Stabilized by Amino Acids" authored by Zhang et al. and published in Chem. Mater. (1997) 9, 2249-2251.*
Akcakir, O., et. al., "Detection of Luminescent Single Ultrasmall Silicon Nanoparticles using Fluctuation Correlation Spectroscopy", *Applied Phyics Letters*, vol. 76, No. 14, pp. 1857-1859, 2000.
Al Dwayyan, A.S., et. al., "Effect of DCCA on the Optical and Lasing Properties of Dye Doped Silica Gels/Ormosils", *Canadian Journal of Pure & Applied Sciences*, vol. 2, No. 1, pp. 221-226, 2008.
Belomoin, G., et. al., "Observation of a Magic Discrete Family of Ultrabright Si Nanoparticles", *Applied Physics Letters*, vol. 80, No. 5, pp. 841-843, 2002.
Nayfeh, M., et. al., "Highly Nonlinear Photoluminescence Threshold in Porous Silicone", *Applied Physics Letters*, vol. 75, No. 26, 4112-4114, 1999.

* cited by examiner

*Primary Examiner* — Marc Zimmer
(74) *Attorney, Agent, or Firm* — Greer, Burns & Crain Ltd.

(57) ABSTRACT

Embodiments of the invention provide silicon-based nanoparticle composites, where the silicon nanoparticles are highly luminescent. Preferred embodiments of the invention are Si—O solid composite networks, e.g., glass, having a homogenous distribution of luminescent hydrogen terminated silicon nanoparticles in a homogenous distribution throughout the solid. Embodiments of the invention also provide fabrication processes for silicon-based silicon nanoparticle composites. A preferred method for forming a silicon-based nanoparticle composite disperses hydrogen terminated silicon nanoparticles and an inorganic precursor of an organosilicon gel in an aprotic solvent to form a sol. A catalyst is mixed into the sol. The sol is then permitted to dry into a gel of the silicon-based nanoparticle composite.

12 Claims, 4 Drawing Sheets

SILICON-BASED NANOSILICON COMPOSITES AND FABRICATION METHODS

CLAIM FOR PRIORITY AND REFERENCE TO RELATED APPLICATION

This application claims priority under 35 U.S.C. §119 from prior provisional application Ser. No. 61/153,088, which was filed Feb. 17, 2009.

FIELD

A field of the invention is silicon-based composites, particularly Si—O networks.

BACKGROUND

There has been interest in incorporating nanometer sized crystalline semiconductors into glass matrices because nanoparticles are expected to increase the functionality of the composites. Nanoparticles are expected to add fast optical switching and optical nonlinearity capabilities. Other potential features of silicon-based nanoparticle composites include radiation and mechanical hardening, electromagnetic shielding, and optical activation.

Sol gel processes have been studied as processes to incorporate nanocrystal materials into glass matrices. The sol gel processes offer low temperature processing that typically provides homogenous composite materials. There have been attempts to incorporate silicon nano material into a silica sol-gel matrix, but stabilization of the Si nanoparticles photoluminescence (PL) properties has proved to be elusive.

Sol gel processes utilize a mixture of several chemicals and are sensitive to the nature of precursor components, solvents, catalysts and their pH value. See, Zhang et al., "Properties of Luminescent Si Nanoparticles in Sol-Gel Matrices," 1998, J Sol Gel Sci Technol, 11:267-2. A known attempt to incorporate Si nanoparticles via a sol gel process using ethanol as a solvent led to quenching of the Si nanoparticles photoluminescence properties. Others have reported luminescence quenching with polar solvents and less, but still substantial quenching with non polar solvents.

SUMMARY OF THE INVENTION

Embodiments of the invention provide silicon-based nanoparticle composites, where the silicon nanoparticles are highly luminescent. Preferred embodiments of the invention are Si—O solid composite networks, e.g., glass, having a homogenous distribution of luminescent hydrogen terminated silicon nanoparticles in a homogenous distribution throughout the solid. Embodiments of the invention also provide fabrication processes for silicon-based silicon nanoparticle composites. A preferred method for forming an a silicon-based nanoparticle composite disperses hydrogen terminated silicon nanoparticles and an inorganic precursor of an organosilicon gel in an aprotic solvent to form a sol. A drying agent is then added to the sol. A catalyst is mixed into the sol. The sol is then permitted to dry into a gel of the silicon-based nanoparticle composite.

DETAILED DESCRIPTION OF THE PREFERRED EMBODIMENTS

Figure 1:
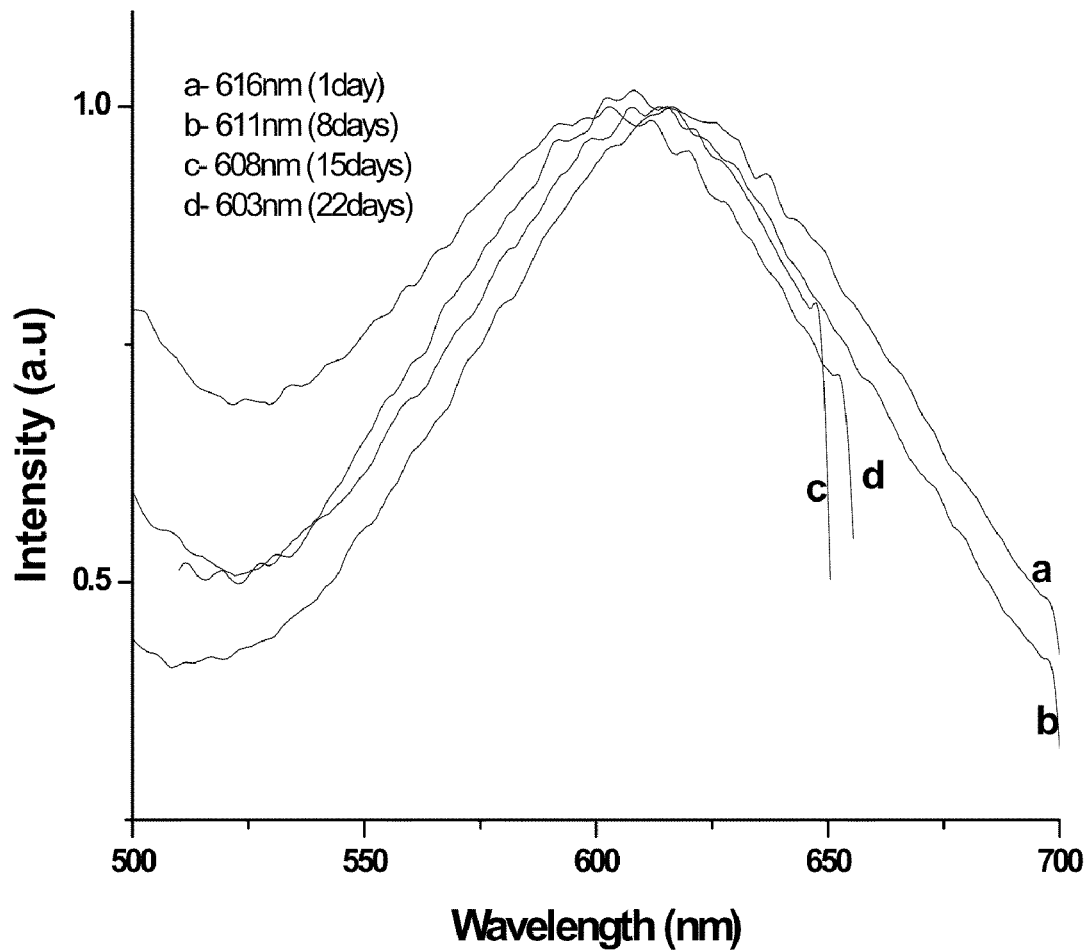
FIG. 1 shows the normalized emission spectra of Si nanoparticles incorporated into organosilicon sol gel of the invention produced by a method of the invention over different aging times.

Embodiments of the invention provide silicon-based nanoparticle composites, where the silicon nanoparticles are highly luminescent. Preferred embodiments of the invention are Si—O solid glass composite networks having a homogenous distribution of luminescent hydrogen terminated silicon nanoparticles in a homogenous distribution throughout the solid.

Embodiments of the invention also provide fabrication processes for silicon-based nanoparticle composites. A preferred method for forming a silicon-based nanoparticle composite disperses hydrogen terminated silicon nanoparticles and an inorganic precursor of an organosilicon gel in an aprotic solvent to form a sol. A drying agent is then added to the sol. A catalyst is mixed into the sol. The sol is then permitted to dry into a gel of the silicon-based nanoparticle composite.

Preferred embodiments of the invention will now be discussed with respect to experiments that were conducted to form example silicon-based nanoparticle composites. Artisans will recognize broader aspects and variations of the invention from the experiments. Artisans will also appreciate that the laboratory equipment used in the experiments does not limit the fabrication processes.

The experimental fabrication processes of the invention utilized a heterocondensation of organosilicon and nanosilicon in a sol-gel process. The process uses an organosilicon precursor liquid of Tetraethylorthosilane (TEOS), which is $Si(OC_2H_5)_4$, and silicon nanoparticles as precursor components. Dispersions in TEOS are not stable, indicating that the silicon nanoparticles are immiscible in the strongly polar organic solvent. THF (Tetrahydrofuran), a moderately polar solvent, serves as a mutual solvent for both organosilicon and nanosilicon, to stabilize the dispersion. Dimethlyformamide (DMF) acts as drying chemical control additive (DCCA), and aqueous nitric acid as catalyst to produce solid Si—O composite with luminescent silicon nanoparticle centers. Fabrication processes of the invention produce composites that are homogeneous and photostable over extended periods.

Silicon nanoparticles are insubstantially quenched in sol gel solid glass networks of the invention. Neither identification or understanding of the underlying mechanism for quenching is necessary to practice embodiments of the present invention, but it is believed that the lack of hydrogen termination of the nanoparticles in prior methods leads to oxidation, which can causing quenching and can also change the spectral characteristics the photoluminescence of the nanoparticles.

The silicon nanoparticles in the experiments were dispersed from silicon wafers using chemical etching, but other known techniques for producing silicon nanoparticles can be used. Example techniques are disclosed in U.S. Pat. Nos. 6,585,947 & 6,743,406. The etching method results in silicon nanoparticles with multiple Si—H termination sites. The hydrogen termination is important to the fabrication processes of the invention. The '406 patent provides for hydrogen terminated 1 nm (blue emitting), 1.67 nm (green emitting), 2.15 nm (yellow emitting), 2.9 nm (red emitting) and 3.7 nm (infrared emitting) nanoparticles.

While other sized particles can be used, the experiments used the red 2.9 nm luminescent silicon nanoparticles. For the experiments, red luminescent silicon nanoparticles were synthesized using highly catalyzed gradual chemical etching in HF and $H_2O_2$ (such as disclosed in U.S. Pat. Nos. 6,585,947 & 6,743,406) to disperse crystalline Si into ultrasmall nanoparticles. Because HF is highly reactive with silicon oxide, $H_2O_2$ catalyzes the etching, producing smaller particles. Moreover, the oxidative nature of the peroxide produces high chemical and electronic quality samples. The pulverized wafer is then transferred into a solvent. The solvent in the experiments was Tetrahydrfuran (THF). Sonication of the nanoparticles in an ultrasound bath disperses the Si nanoparticles. Samples were centrifuged to screen the particles. Verification of red silicon nanoparticles was tested with an incoherent low intensity commercial UV lamp at 365 or 254.

Experiments were conducted with Tetraethylorthosilane (TEOS) (Aldrich, 98%) as the inorganic precursor and THF as solvent. Dimethylformamide (DMF) was added to the TEOS/THF solution under stirring in an open glass beaker, as drying chemical control additive (DCCA). The stirring was typically conducted for about 40 minutes.

A first aspect of the experiments examined the stability of the silicon nanoparticle dispersion in TEOS ($Si(OC_2H_5)_4$). The results showed that dispersions of silicon nanoparticles in TEOS without the TFH solvent are not stable. This indicated that the particles are immiscible in the strongly polar organic TEOS solvent. The dispersion was also not stable in a mixture of TEOS and ethanol. A mixture of TEOS and THF, a weakly polar solvent, renders the dispersion stable. It is believed that this indicates that THF likely acted as a mutual solvent for the particles and the TEOS.

As catalyst, a distilled water/Nitric acid mixture was added to the solution and stirred. Stirring was conducted typically for about 30 minutes. Finally 1.5 ml of Si nanoparticles colloid in THF was mixed with 8 ml of final sol. The molar ratio of TEOS: THF: DMF: water: Nitric acid in the sample was [1:1.5:0.5:1:0.01] respectively. 8 ml of final sol was put in a polystyrene cylindrical test tube. The final Si mixture sol was sonicated for uniform distribution of the Si nanoparticles in the solution, and allowed to form the gel. Luminescence spectra were taken by UV-Visible Spectrophotometer (Perkin Elmer Lamda 40) and Luminescence Spectrophotometer (LS 45 Perkin Elmer). When allowed to dry, the gels form into a glass. Heating can also be used to harden the gel into a glass. Annealing may be used but is likely unnecessary. The tests were conducted in containers in laboratory conditions, and allowing the gel to dry and harden in a shaped mold is expected to produce quality glass.

TEOS has highly polar Si—O bonds. The bonds attract each other strongly, excluding the nonpolar nanoparticles. The fact that dispersions in TEOS are not stable indicates that the particles are immiscible in the strongly polar organic solvent. THF ($C_4H_8O$) is an aprotic solvent, which is moderately polar. It dissolves a wide range of non-polar and polar compounds. The silicon nanoparticles used in the methods have Si—H termination. The particles are believed to attach to the O site in THF. Because of the moderate polarity of THF, it is expected to mix in TEOS. In fact, when the particles are produced in a mixture of TEOS and THF, the dispersion is stable, indicating that THF likely acted as a mutual solvent for both.

While not necessary for practicing the above fabrication methods, we believe that the following is the likely mechanism for incorporation of the nanoparticles in the solid phase of the sol-gel. First, we should note that TEOS is commonly used for deposition of silicon oxide $SiO_2$. At high temperature (>600 C) TEOS decomposes into $SiO_2$ and diethyl ether, ($C_4H_{10}O$). Second, TEOS is used as a cross linking agent in silicon polymers. In the presence of water, TEOS decomposes in silicon oxide and ethanol. This hydrolysis reaction is an example of a sol-gel process. In the process, multidimensional networks of —O—Si—O—Si—O—Si—O—Si—O—Si— form. The structure of TEOS may also be looked at as four ethyl groups $C_2H_5$ attached to the orthosilicate (Si $O_4)_4$— ion. TEOS may also act as ethyl ester orthosilicate acid $Si(OH)_4$. This acid can cross link with our Si—H terminated silicon nanoparticles to produce Si (OH)3-SiNP while releasing a water molecule. This process provides a plausible mechanism for incorporation of a small fraction of nanoparticles in the solid phase of the sol-gel process. Because it is a chemical phase it is expected to result in a homogeneous dissolution of the particles.

The photostability of the luminescence at the various stages and phases of the preparation of the composite was examined. Red emitting Si nanoparticles were observed suspended in THF solvent, under UV radiation, taken before hydrolysing with sol gel solution. Red emitting Si nanoparticles incorporated in sol solution, under UV radiation, were also observed in the first day of preparation. The characteristic color of red Si photoluminescence is still visible after forming the gel state. Images taken during the experiments show that the red luminescence is homogeneous, with no major segregation, agglomeration or precipitation of the nanomaterial in the gel. A control sol-gel sample with no particles was active in the blue under UV excitation with a band extending from 330 to 500 nm.

FIG. 1 illustrates normalized luminescence spectra using irradiation at 365 nm that demonstrate no substantial quenching of nanoparticle luminescence and stability over time. Luminescence spectra of silicon nanoparticle composite sol gel with aging time is shown in FIG. 1, which indicates that the luminescence did not suffer an appreciable shift, nor it has been quenched over thirty days after synthesis.

Figure 2A:
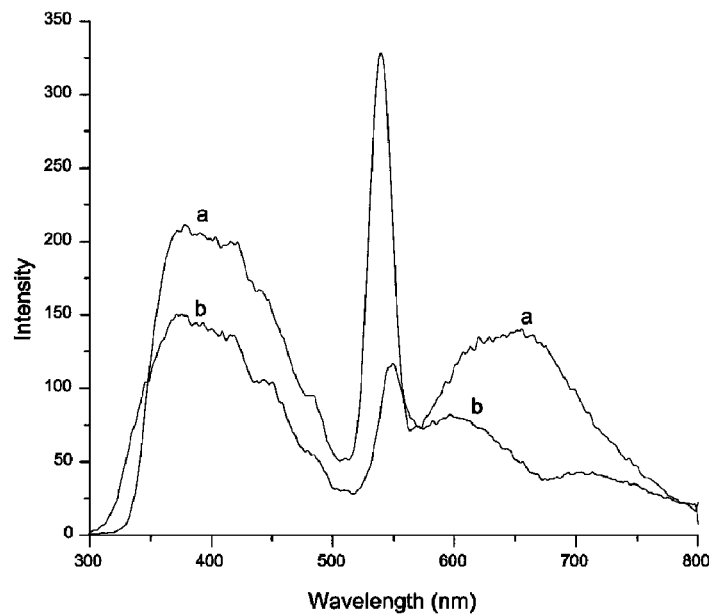
FIGS. 2A-2C shows the luminescence spectrum of the sol-gel in the liquid phase as well as the solid phase under excitation with (a) 265 nm, (b) 350 nm, and (c) 390 nm.
Figure 2B:
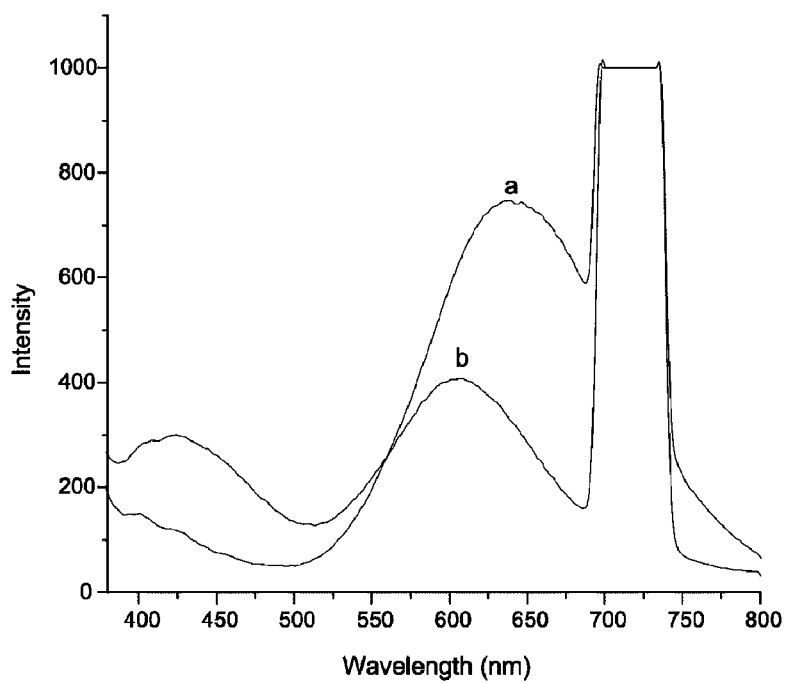
Figure 2C:
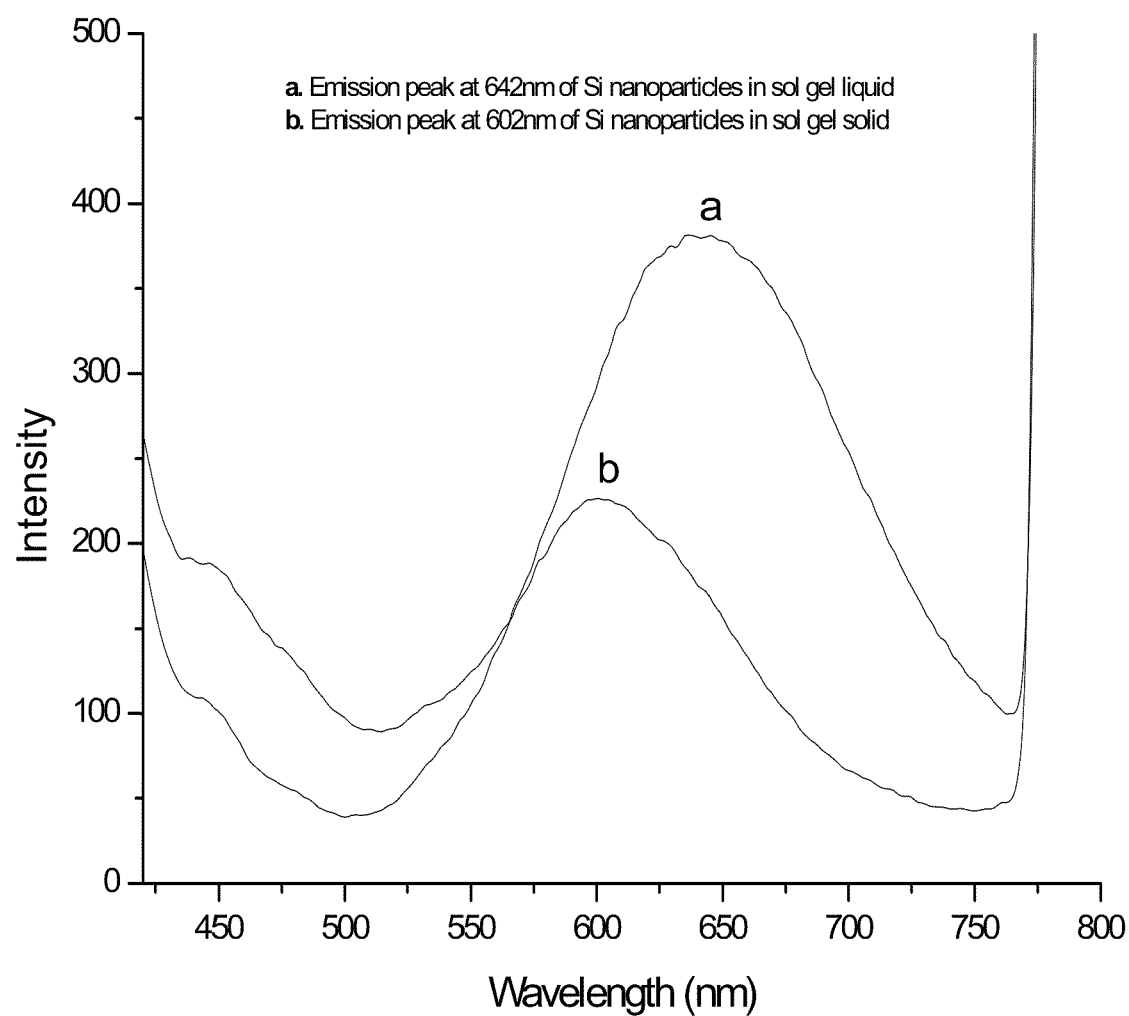

The effect of polymerization on the intensity of the red band compared to the blue band of the sol-gel is displayed FIGS. 2A-2C. FIGS. 2A-2C respectively, showing the response under excitation of 265, 350, and 390 nm. Each spectra shows a red band that is due to the nanoparticles and a uv/blue band due to the silicon-based matrix itself. We compare the strength of the red band to strength of the blue band (ratio) to check the stability of the emission from the nanoparticles upon polymerization. In FIG. 2A, the "a" trace shows emission in sol gel liquid. The "b" trace illustrates emission peaks in sol gel solid. In FIG. 2B, the "a" trace shows emission in sol gel liquid. The "b" trace illustrates emission in sol gel solid. In FIG. 2C, the "a" trace shows emission in sol gel liquid. The "b" trace illustrates emission in sol gel solid. The red band intensity stays at the same level with respect to the blue band before and after conversion to the gelatin state when excited by 265 nm, where as it suffers a factor of three reduction for 350 and 390 nm excitation. This indicates an increase in the efficiency of excitation of the blue band of the silicon-based component under polymerization.

The mechanical integrity of the silicon-based nanoparticle composite gel was also monitored. When a sample was stored in a glass cuvette, the sample cracked after a month of aging. The cracking is likely due to stress at the glass interface of the cuvette caused by shrinkage of the composite upon drying. Due to cracking it was not possible to make further measurements of the luminescence of the sample stored in the glass cuvette. Another sample silicon-based nanoparticle composite gel was aged and dried at room temperature in a cylindrical polystyrene tube. This sample showed stability for more than three months. Free standing samples and samples that can be dislodged from a mold are expected to remain stable for longer periods of time. The cracking appears to be attributable to the gel-mold interface.

Figure 3A:
FIGS. 3A and 3B are SEM images of (a) a control sol gel without Si nanoparticles and (b) Si nanoparticles doped in a sol gel matrix of the invention.
Figure 3B:

Scanning electron microscopy (SEM) was used to inspect silicon-based nanoparticle composite gels. FIG. 3A shows an image of a control gel lacking silicon nanoparticles, and FIG. 3B shows an image of a silicon-based nanoparticle composite gel. The FIG. 3A SEM image of sol gel without Si nanoparticles is observed to be smooth at a resolution of 10 nm, the resolution of the SEM. No inhomogeneous formations were observed in the 100 nm range. The FIG. 3B image of the silicon-based nanoparticle composite gel shows predominantly smooth topography, except for few isolated spots, which shows some cluster formation of characteristic size of 150 nm, with negligible corrugation. There is not believed to be any substantial clustering or aggregation. The luminescence is observed to be homogeneous, so the silicon nanoparticles are in large part homogenously dissolved except for a few percent that may have corrugated to form pockets of ~150 nm across clusters. The SEM image in FIG. 3B does not reveal individual silicon nanoparticles in the silicon-based nanoparticle composite gel because the resolution of the SEM is limited to 20 nm, incapable of resolving individual 3 nm particles.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for forming a silicon-based nanoparticle composite, the method comprising steps of:
    dispersing hydrogen terminated silicon nanoparticles and an inorganic precursor of an organosilicon gel in an aprotic solvent to form a sol;
    adding a drying agent to the sol;
    mixing a catalyst into the sol; and
    permitting the sol to dry into a gel of the silicon-based nanoparticle composite.

2. The method of claim 1, wherein the inorganic precursor comprises Tetraethylorthosilane ($Si(OC_2H_5)_4$).

3. The method of claim 2, wherein the solvent comprises a weakly polar stabilizing solvent.

4. The method of claim 3, wherein the solvent comprises Tetrahydrofuran (THF).

5. The method of claim 1, wherein the solvent comprises a weakly polar stabilizing solvent.

6. The method of claim 5, wherein the solvent comprises Tetrahydrofuran (THF) ($C_4H_8O$).

7. The method of claim 6, wherein the drying agent comprises Dimethylformamide (DMF).

8. The method of claim 7, wherein the catalyst comprises aqueous nitric acid.

9. The method of claim 1, further comprising a preliminary step of fabricating the hydrogen terminated silicon nanoparticles by highly catalyzed gradual chemical etching of a silicon wafer in HF and $H_2O_2$, followed by sonication of the wafer in an ultrasound bath to disperse the particles.

10. The method of claim 9, wherein the ultrasound bath comprises Tetrahydrofuran (THF) ($C_4H_8O$).

11. The method of claim 1, further comprising a step of heating the gel to form glass.

12. The method of claim 1, wherein said step of permitting permits the drying to continue until the gel forms a glass.

* * * * *

UNITED STATES PATENT AND TRADEMARK OFFICE
CERTIFICATE OF CORRECTION

PATENT NO. : 8,367,769 B2
APPLICATION NO. : 12/707247
DATED : February 5, 2013
INVENTOR(S) : Aldwayyan et al.

Page 1 of 1

It is certified that error appears in the above-identified patent and that said Letters Patent is hereby corrected as shown below:

In the Specification:

Col. 2, line 56    Please delete "causing" and insert --cause-- therefor.

Signed and Sealed this
Thirtieth Day of July, 2013

Teresa Stanek Rea
*Acting Director of the United States Patent and Trademark Office*